United States Patent

Monereau et al.

[11] Patent Number: 5,529,611
[45] Date of Patent: Jun. 25, 1996

[54] PROCESS FOR THE TREATMENT OF A GASEOUS MIXTURE BY ADSORPTION WITH PRESSURE VARIATION

[75] Inventors: Christian Monereau; Wilfrid Petrie, both of Paris; Christian Barbe, Fontenay aux Roses; Michel Eclancher, Issy les Moulineaux; Xavier Vigor, Viroflay, all of France

[73] Assignee: L'Air Liquide, Societe Anonyme pour l'Etude et l'Exploitation des Procedes Georges Claude, Paris, France

[21] Appl. No.: 405,309

[22] Filed: Mar. 16, 1995

[30] Foreign Application Priority Data

Jun. 27, 1994 [FR] France .................. 94 07886

[51] Int. Cl.⁶ .............................................. B01D 53/047
[52] U.S. Cl. .............................................. 95/101; 95/130
[58] Field of Search ................ 95/1, 11, 21, 95–105, 95/130

[56] References Cited

U.S. PATENT DOCUMENTS

| | | | |
|---|---|---|---|
| 4,140,495 | 2/1979 | Pietruszewski | 95/98 X |
| 4,222,750 | 9/1980 | Gauthier et al. | 95/130 X |
| 4,539,019 | 9/1985 | Koch | 95/130 X |
| 4,643,743 | 2/1987 | Grader | 95/130 X |
| 4,684,377 | 8/1987 | Haruna et al. | 95/130 X |
| 4,756,723 | 7/1988 | Sirear | 95/103 |
| 4,781,735 | 11/1988 | Tagawa et al. | 95/130 X |
| 4,810,265 | 3/1989 | Lagree et al. | 95/130 X |
| 4,813,977 | 3/1989 | Schmidt et al. | 95/130 X |
| 4,892,565 | 1/1990 | Schmidt et al. | 95/130 X |
| 4,917,710 | 4/1990 | Haruna et al. | 95/130 X |
| 4,948,391 | 8/1990 | Noguchi | 95/98 |
| 4,969,935 | 11/1990 | Hay | 95/130 X |
| 5,084,075 | 1/1992 | Sircar | 95/130 X |
| 5,163,978 | 11/1992 | Leavitt et al. | 95/130 X |
| 5,223,004 | 6/1993 | Etéve et al. | 95/98 |
| 5,232,473 | 8/1993 | Kapoor et al. | 95/101 |
| 5,248,322 | 9/1993 | Kumar | 95/130 X |
| 5,258,056 | 11/1993 | Shirley et al. | 95/97 X |
| 5,261,947 | 11/1993 | Hay et al. | 95/101 |
| 5,354,346 | 10/1994 | Kumar | 95/130 X |
| 5,393,326 | 2/1995 | Engler et al. | 95/130 X |
| 5,407,465 | 4/1995 | Schaub et al. | 95/130 X |
| 5,429,666 | 7/1995 | Agrawal et al. | 95/130 X |

*Primary Examiner*—Robert Spitzer
*Attorney, Agent, or Firm*—Young & Thompson

[57] ABSTRACT

A process for treating a gaseous mixture, particularly air, by pressure swing adsorption (PSA), of the type in which three adsorbers (1 to 3) are used in each of which is carried out, for a given nominal production, a cycle comprising the following successive stages, the cycle being offset from one adsorber to the other by a third of the nominal duration (T) of the cycle:

(a) a substantially isobaric adsorption phase at a high pressure (PM) of the cycle, by circulation of the mixture through the adsorber in a so-called co-current direction;

(b) a desorption phase comprising a stage (b2) of pumping to a low pressure ($P_m$) of the cycle less than atmospheric pressure, via a vacuum pump (7) of constant speed and continuous operation whose output is in the vicinity of atmospheric pressure; and (c) a repressurization phase of the adsorber to the high pressure of the cycle. During a reduction of the production flow rate, the mean intake pressure of the vacuum pump is raised for the duration of the cycle.

10 Claims, 4 Drawing Sheets

PROCESS FOR THE TREATMENT OF A GASEOUS MIXTURE BY ADSORPTION WITH PRESSURE VARIATION

BACKGROUND OF THE INVENTION

The present invention relates to a process for the treatment of a gaseous mixture, particularly air, by pressure variation adsorption, of the type in which three adsorbers are used in each of which is carried out, for a given nominal production, a cycle comprising the following successive steps, the cycle being offset from one adsorber to another by a third of the nominal duration of the cycle:

(a) a nearly isobaric adsorption phase at a high pressure of the cycle, by circulation of the mixture in the adsorber in the co-current direction;

(b) a desorption phase comprising a step of pumping to a low pressure of the cycle below atmospheric pressure, by means of a vacuum pump of constant speed and continuous operation whose output is adjacent atmospheric pressure; and (c) a repressurization phase of the adsorber to the high pressure of the cycle.

The invention thus relates to the technique of separation of gaseous mixtures by pressure variation adsorption with regeneration under vacuum of the adsorbent, often called "VSA" (Vacuum Swing Adsorption). It is applicable in particular to the production of impure oxygen from atmospheric air, called "VSA $O_2$".

The apparatus (adsorbers, blowers or compressors for the introduction of the mixture to be treated, vacuum pump) of the VSA $O_2$ units are dimensioned for a given so-called nominal production, corresponding to a given flow rate, purity and pressure of the oxygen product. For nominal production, the unit is thus optimized. When during a certain time period, the oxygen demand falls below the nominal flow rate, the unit must be adjusted to this new flow rate. The known means to effect this adjustment are as follows:

(1) Simple reduction of the flow rate of withdrawn oxygen, by a partial closing of the oxygen production valve or, if the oxygen is compressed at the outlet of the unit, by action on the regulation means of the flow rate of the compressor.

The drawback of this technique is two-fold: on the one hand, the purity of the oxygen product varies, and on the other hand, the energy consumption of the unit is the same for a reduced production, which increases the specific cost of the oxygen product.

(2) Operation of the machines intermittently. This operation gives rise to frequent restarting of the machines, which is incompatible with their reliability, and/or the installation of large storage chambers for oxygen.

(3) The use of variable speed motors to drive the inlet blower (or the compressor) and the pump, which permits prolonging the cycle time while keeping the pressure levels of operation nominal.

The drawback of this technique resides in the fact that the devices of this type are costly and give rise, at nominal flow rate, to an additional energy consumption due to the inefficiency of the speed changers.

(4) The use of motors of several speeds, which are relatively costly and do not permit obtaining very precise optimized reduced operations, for example an operation at 100% of the nominal flow rate and one at 100%.

SUMMARY OF THE INVENTION

The invention has for its object to permit reducing as desired the flow rate of the gaseous product without substantial additional investment, without modification of the purity of the gaseous product and with a corresponding reduction of the consumption of energy.

To this end, the invention has for its object a process of the mentioned type, characterized in that during a reduction of the flow rate of production, the mean intake pressure of the vacuum pump is raised for the duration of the cycle.

The process according to the invention can comprise one or several of the following characteristics:

during a reduction of the production flow rate, for a fraction of the desorption phase, the pump intake is connected solely to an external source of auxiliary gas available at a pressure higher than the mean intake pressure of the vacuum pump during nominal operation, particularly adjacent atmospheric pressure;

the duration of the cycle is prolonged by three times the duration of said fraction;

during a reduction of the production flow rate, for at least one fraction of the cycle, the intake of the pump is connected both to an adsorber and to an external source of auxiliary gas available at a pressure higher than the mean intake pressure of the vacuum pump during nominal operation, particularly adjacent atmospheric pressure;

said fraction of the cycle is equal to the entirety of the cycle;

the auxiliary gas is atmospheric air or residual gas from the adsorbers;

during a reduction of the production flow rate, for a final fraction of the adsorption phase, gas from the adsorber is sent to the outlet of another adsorber whose inlet is connected to the intake of the pump.

The invention also has for its object the use of the process defined above in a cycle in which, for a nominal production:

the desorption phase comprises a step of cocurrent decompression followed by a step of pumping in the opposite direction, called countercurrent, and the recompression phase comprises a step of countercurrent elution with the gas from another adsorber in the course of the co-current decompression step, followed by a step of countercurrent repressurization with gas from another adsorber in the adsorption phase.

In such a use, in one embodiment of the invention, during a reduction of the production flow rate, the change is made faster from the co-current decompression step to the countercurrent pumping step.

BRIEF DESCRIPTION OF THE DRAWINGS

Examples of the practice of the invention will now be described with respect to the accompanying drawings, in which.

DESCRIPTION OF THE PRESENT EXAMPLE

Figure 1:
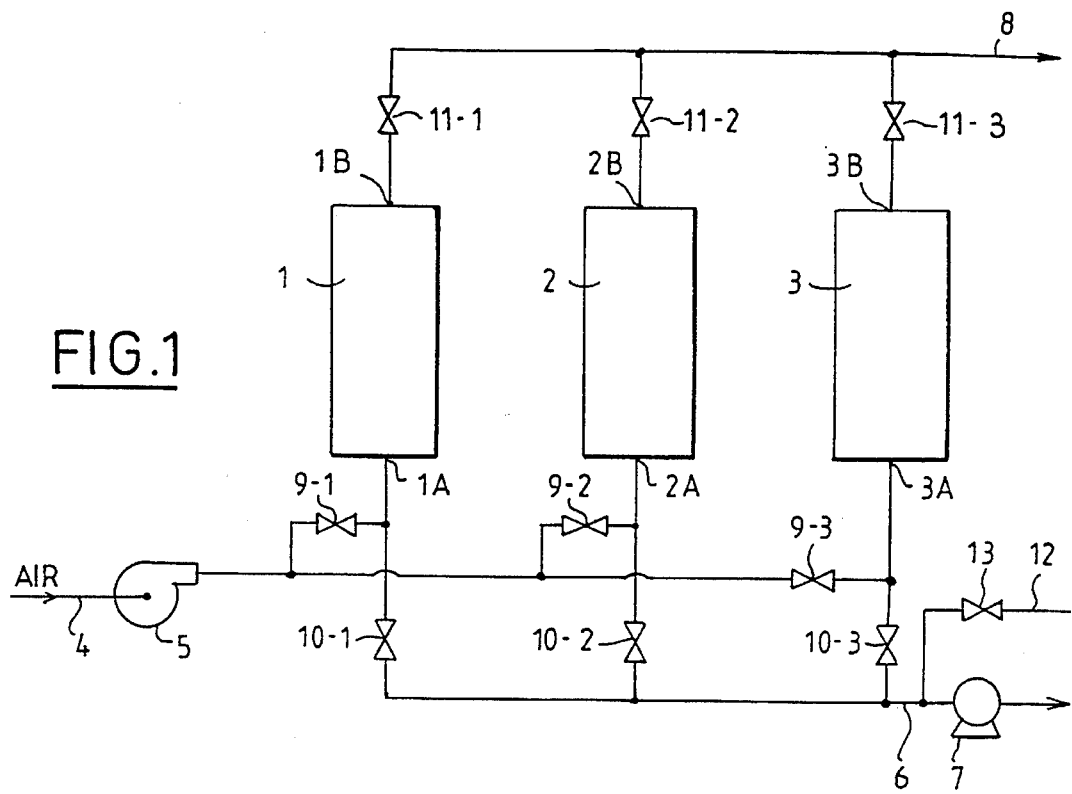
FIG. 1 shows schematically a VSA $O_2$ unit adapted for the practice of the process according to the invention.

The installation shown in FIG. 1 is adapted to produce air enriched in oxygen, or impure oxygen, with a content comprised between about 90 and 95%, from atmospheric air that has not been purified. It comprises three adsorbers 1 to 3, an inlet line 4 provided with a ventilator or a blower 5, a pumping line 6 provided with a vacuum pump 7 discharging to the ambient, and an enriched air production line 8. Each adsorber has a cylindrical shape and comprises a lower inlet 1A to 3A and an upper outlet 1B to 3B. The adsorbers are filled with an adsorbent which preferentially adsorbs nitrogen relative to oxygen and argon, particularly a molecular sieve of type 5A or 13X. If desired, each adsorber can comprise at its base a layer of another adsorbent having a desiccating action, particularly alumina or silica gel. The pump 7 is volumetric, for example of the Roots type.

The line 4 is connected to the inlet of each adsorber by means of a respective valve 9-1 to 9-3. Similarly, the line 6 is connected to the inlet of each adsorber by means of a respective valve 10-1 to 10-3. The line 8 is connected to the outlet of each adsorber by means of a respective valve 11-1 to 11-3.

The intake of pump 7 can moreover be connected to the ambient air via a conduit 12 provided with a valve 13.

Figure 2:
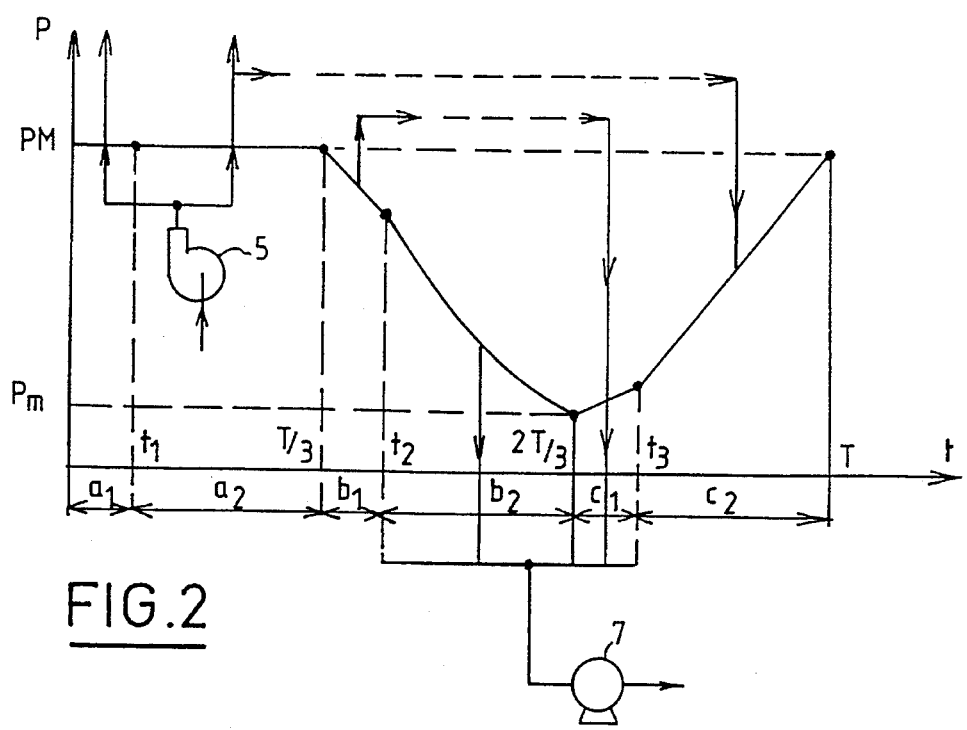
FIG. 2 is a diagram illustrating a VSA cycle to which the invention is applied.

By means of this installation, there is effected for each adsorber, for the nominal production of enriched air, a cycle which is shown in FIG. 2 with reference to the adsorber 1. If T designates the duration of the cycle, the operation of the adsorber 2 is offset by the time T/3 and that of the adsorber 3 is offset by the time 2T/3. In the illustrated example, there could be chosen for example a cycle duration of one minute to several minutes. The machines 5 and 7 are continuously driven at constant speed.

In FIG. 2, in which the times t are on the abscissae and absolute pressures P on the ordinates, the arrowed lines indicate the movements and destinations of the gas flows; when the arrows are parallel to the axis of the ordinates, they indicate, moreover, the direction of circulation in an adsorber: when one arrow points in the direction of increasing ordinates (toward the top of the diagram), the flow direction in the adsorber is co-current; if the arrow that points upward is located below the line indicating the pressure in the adsorber, the flow enters the adsorber by the inlet end of the adsorber; if the arrow that is directed upwardly is located above the line indicating pressure, the flow leaves the adsorber by the outlet end of the adsorber, the inlet and outlet ends being respectively those of the gas to be treated by the adsorber in question and of the gas withdrawn from this same adsorber during the adsorption phase; when an arrow is directed in the direction of decreasing ordinates (downwardly in the diagram), the flow direction in the adsorber is countercurrent. If the downwardly directed arrow is located below the line indicating the pressure in the adsorber, the flow leaves the adsorber by the inlet end of the adsorber; if the downwardly directed arrow is located above the line indicating pressure, the current enters the adsorber by the outlet end of the adsorber, the inlet and outlet ends being always those of the gas to be treated and of the gas withdrawn during the adsorption phase. On the other hand, there are shown in full lines the gas flows which relate exclusively to one adsorber and in broken lines the gas currents from or toward other adsorbers.

The complete cycle will now be described for one adsorber, for example the adsorber 1, referring to FIGS. 1 and 2. In the example of FIG. 2, the cycle proceeds between two extreme pressures, namely a high or maximum pressure PM comprised between atmospheric pressure and 1.2 bar absolute, and a low or minimum pressure Pm comprised between 100 and 400 mb, which explains the use of the blower 5 and of the vacuum pump 7.

The cycle of FIG. 2 comprises:

(a) from t=0 to T/3, an isobaric adsorption phase at the pressure PM, in the course of which atmospheric air to be treated is admitted to the inlet of the adsorber and circulates co-currently in the latter, while gas (air enriched in oxygen) is withdrawn at the outlet of the adsorber. This phase is divided into two stages:

(a1) from t=0 to t1, all the withdrawn gas constitutes production gas, which is to say air enriched to 95% oxygen (which will be designated in the following simply by the word "oxygen");

(a2) from t1 to T/3, a portion of the withdrawn gas constitutes production gas, and the rest is transferred to the outlet of another adsorber in recompression phase;

(b) from T/3 to 2T/3, a desorption phase, which is subdivided into two stages:

(b1) from T/3 to t2, with t2−T/3=t1 a cocurrent decompression stage, in the course of which the gas is withdrawn from the outlet of the adsorber and transferred to the outlet of another adsorber at the beginning of the recompression phase; and (b2) from t1 to 2T/3, a countercurrent pumping stage, during which the inlet of the adsorber is connected to the intake of the pump 7.

(c) from 2T/3 to T, a recompression phase which is subdivided into two stages:

(c1) from 2T/3 to t3, with t3−2T/3=t1, an elution phase with pumping in which the adsorbent receives at its outlet gas from the outlet of another adsorber during stage (b1) of co-current decompression, whilst a lower flow rate of gas is taken in countercurrently by the pump 7; and (c2) from t3 to T, a countercurrent recompression phase using gas withdrawn from the outlet of another adsorber during adsorption stage (a2).

Figure 3:
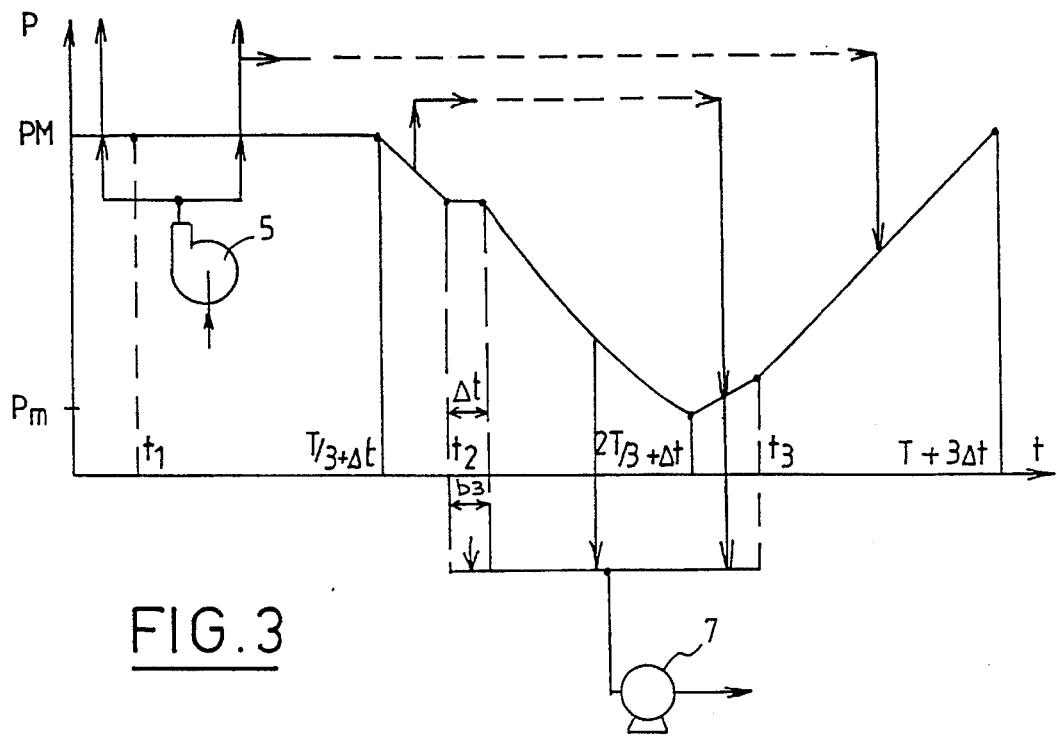
FIGS. 3 to 7 are analogous diagrams showing respectively five embodiments of the practice of the process of the invention for a reduced production flow rate.

When the demand for oxygen falls, the cycle is modified, according to a first procedure of the invention, in the manner shown in FIG. 3.

Between the end of stage (b1) and the beginning of stage (b2), there is interposed a supplemental stage (b3), of a duration $\Delta t$, in the course of which the two ends of the adsorbers are closed while the intake of the pump 7 is connected to the ambient atmosphere. Stages (a2) and (c2) are prolonged by this same duration $\Delta t$, such that the total duration of the cycle becomes $T+3\Delta t$.

Preferably, so that the condition of regeneration of the adsorbers will be the same as in nominal operation, it is desirable that the adsorber treats the same quantity of gas, during each phase, which is to say that the following relation should be observed:

$$D_r \times (T/3 + \Delta t) = D_n \times T/3,$$

in which $D_r$ and $D_n$ designate respectively the reduced flow rate and the nominal flow rate.

There is derived from this relationship:

$$\Delta = T/3 \times (D_n - D_r)/D_r.$$

In this way, the mean intake pressure of the pump is raised during reduced flow, which reduces the pressure difference across this pump. As the speed of the pump, and therefore the volume pumped per unit time, are constant, the power consumed by the pump is reduced.

Supplemental stage (b3) can, as a modification, begin at another moment than phase (b). Thus, in the example of FIG. 4, it takes place at the end of this phase (b), which is to say when the adsorber is at the low pressure $P_m$ of the cycle.

Figure 4:
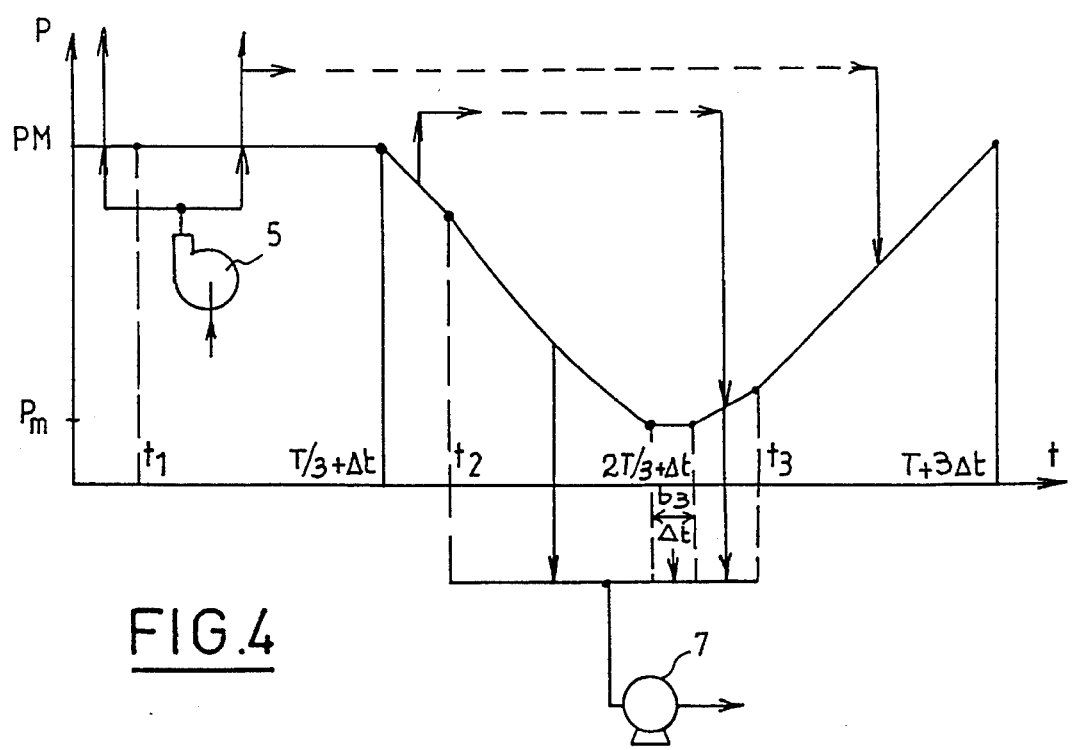

The processes of FIGS. 3 and 4 permit effecting a substantial savings of energy at reduced flow rates. Thus, at a flow rate reduced by half, this saving can represent of the order of a third of the energy consumed during nominal operation.

Figure 5:
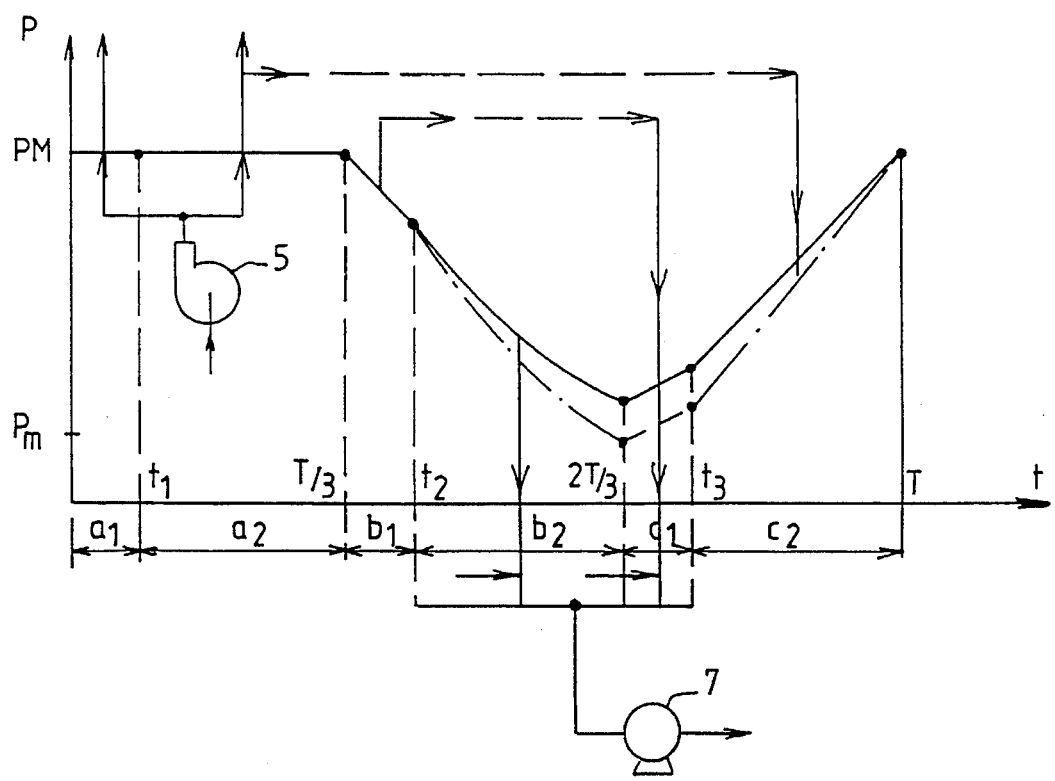

In the example of FIG. 5, operating at reduced flow rate, the intake pressure of the pump is increased by permanently connecting the intake of the latter not only to the outlet of the adsorber in the course of stages (b2) and (c1), but also to the ambient atmosphere, via the conduit 12 and the valve 13 opened to a predetermined extent, without changing duration T of the cycle. The curve of the diagram is thus shifted upwardly between times t2 and T, from the shape of the broken line curve, identical to that of FIG. 2, to the full line shape.

In this example, the less pressured regeneration of the adsorbent, as a function of reduced flow rate, is without penalty, because the volume of the available adsorbent is then in excess.

As a modification, the conduit 12 could be connected to a source of another suitable gas, for example residual gas of the installation, available under a pressure higher than the mean intake pressure of the vacuum pump during nominal operation.

Also as a modification, the auxiliary gas could be used only during a fraction of the cycle, by means of timing or from a predetermined level of reduced pressure.

Figure 6:
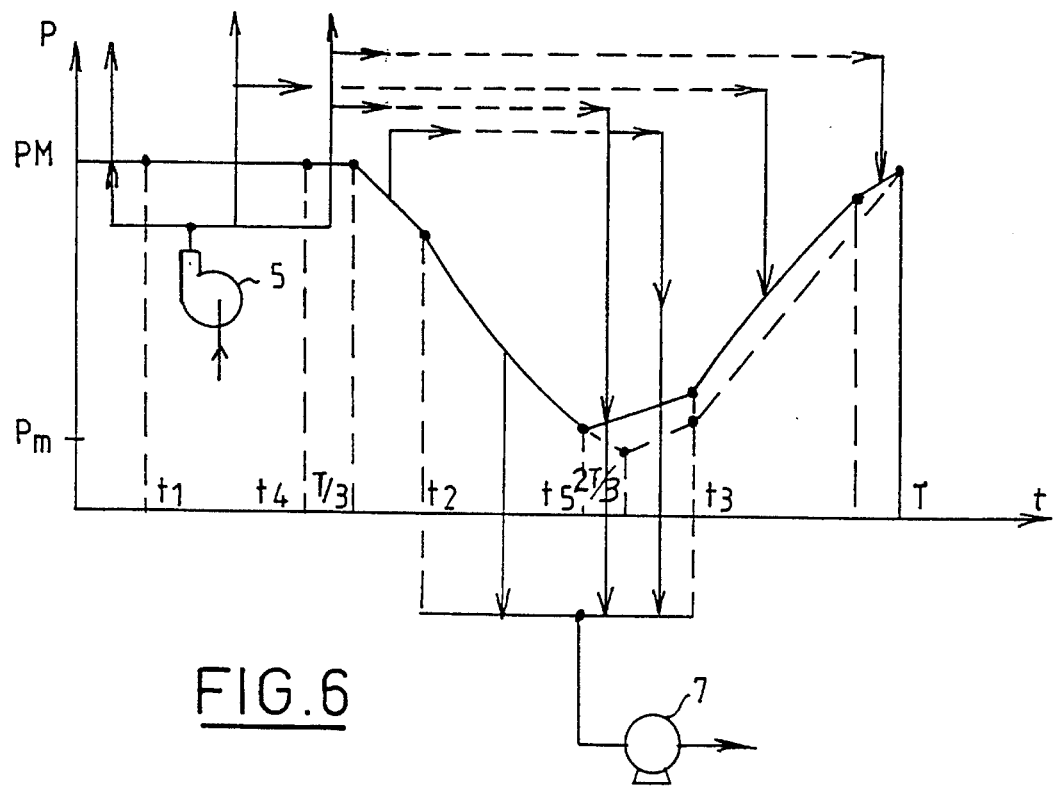

In the example of FIG. 6, as a function of reduced flow rate, from a time T/4<T3 to T/3, a fraction of the oxygen product is withdrawn, and sent to the outlet of another adsorber at the end of phase (b), and therefore whose inlet is connected to the intake of the pump. Thus, from time t5 to 2T/3, this other adsorber is subjected to a supplemental elution and a pre-recompression.

There is again shown in FIG. 6 on the one hand, with broken lines, the curve corresponding to nominal operation, and on the other hand, with full lines, that corresponding to reduced flow operation. Experience shows that, here again, the fall in flow rate is accompanied by a fall of the power consumed by the pump.

Figure 7:
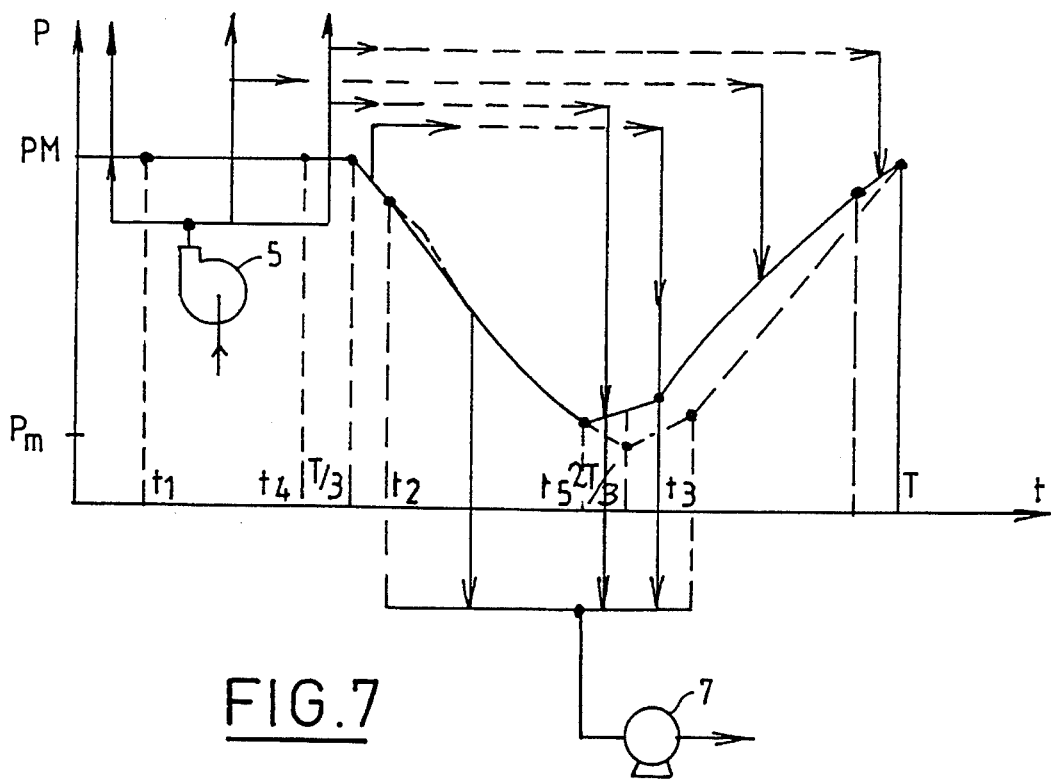

The example of FIG. 7 differs from that of FIG. 6 by the fact that there has moreover been a shortening by the stage (b1) of co-current decompression, as well of course as the concomitant stage (c1). The saving of energy is thus further increased.

It will be understood that the various modifications of the nominal cycle described in connection with FIGS. 3 to 7 can, as the case may be, be combined, or used one or the other according to the reduction of production flow rate.

It will also be understood that the invention permits saving of energy not only during production at reduced flow rate and at constant purity of the oxygen product, but also in the case of reduction of the purity of the oxygen product and without reduction of the production flow rate.

We claim:

1. In a process for treating a gaseous mixture by pressure swing adsorption (PSA), wherein three adsorbers are used in each of which is carried out, for a given nominal production corresponding to a production flow rate, a cycle having a nominal duration and comprising the following successive stages, the cycle being offset from one adsorber to the other by a third of the nominal duration of the cycle:

(a) a substantially isobaric adsorption phase at a high pressure of the cycle, by circulation of the mixture through the adsorber in a co-current direction;

(b) a desorption phase comprising a stage of pumping to a low pressure of the cycle less than atmospheric pressure, by means of a vacuum pump of constant speed and continuous operation having an intake, a mean intake pressure, and whose output is in the vicinity of atmospheric pressure; and (c) a recompression phase of the adsorber to the high pressure of the cycle;

the improvement comprising, during a reduction of the production flow rate, raising the mean intake pressure of the vacuum pump for the duration of the cycle.

2. Process according to claim 1, wherein, during a reduction of the production flow rate, for a fraction of the desorption phase, the intake of the pump is connected only to an external source of auxiliary gas available at a pressure higher than the mean intake pressure of the vacuum pump during nominal operation.

3. Process according to claim 2, wherein the duration of the cycle is prolonged by three times the duration of said fraction of the desorption phase.

4. Process according to claim 2, wherein the auxiliary gas is atmospheric air or residual gas from the adsorbers.

5. Process according to claim 1, wherein, during a reduction of the production flow rate, for at least a fraction of the cycle, the intake of the pump is connected both to a said adsorber and to an external source of auxiliary gas available at a pressure higher than the mean intake pressure of the vacuum pump during nominal operation.

6. Process according to claim 5, wherein said fraction of the cycle is equal to the cycle.

7. Process according to claim 5, wherein the auxiliary gas is atmospheric air or residual gas from the adsorbers.

8. Process according to claim 1, wherein, during a reduction of the production flow rate, for a final fraction of an adsorption phase, gas leaving the adsorber is sent to the outlet of another adsorber whose inlet is connected to the intake of the pump.

9. Process according to claim 1, wherein, for a nominal production:

said desorption phase comprises a co-current decompression stage followed by a pumping stage in the opposite countercurrent direction, and said recompression phase comprises a countercurrent elution phase with gas from another adsorber in the course of said co-current decompression stage, followed by a countercurrent repressurization stage using gas from another adsorber in said adsorption phase.

10. Process according to claim 9, wherein, during a reduction of the production flow rate, said countercurrent repressurization stage follows said co-current decompression stage more quickly.

* * * * *